(12) United States Patent
Kim et al.

(10) Patent No.: US 12,039,526 B2
(45) Date of Patent: Jul. 16, 2024

(54) METHOD FOR TRANSMITTING SPECIFIC DATA WHOSE DATA FORMAT IS UNKNOWN AT RELAY FROM FIRST BLOCKCHAIN NETWORK TO SECOND BLOCKCHAIN NETWORK AND RELAY USING THE SAME

(71) Applicant: PARAMETA Corp., Seoul (KR)

(72) Inventors: Jong Hyup Kim, Seongnam-si (KR); Jae Chang Namgoong, Seoul (KR); Moon Kyu Song, Seongnam-si (KR); Hyeok Gon Ryu, Seongnam-si (KR)

(73) Assignee: PARAMETA Corp., Seoul (KR)

( * ) Notice: Subject to any disclaimer, the term of this patent is extended or adjusted under 35 U.S.C. 154(b) by 0 days.

(21) Appl. No.: 18/468,477

(22) Filed: Sep. 15, 2023

(65) Prior Publication Data

US 2024/0104557 A1    Mar. 28, 2024

(30) Foreign Application Priority Data

Sep. 23, 2022   (KR) .................. 10-2022-0120884
Sep. 5, 2023    (KR) .................. 10-2023-0117826

(51) Int. Cl.
*H04L 9/00*        (2022.01)
*G06Q 20/02*       (2012.01)
(Continued)

(52) U.S. Cl.
CPC ......... *G06Q 20/3821* (2013.01); *G06Q 20/02* (2013.01); *G06Q 20/0655* (2013.01);
(Continued)

(58) Field of Classification Search
CPC ........................................ H04L 9/50
See application file for complete search history.

(56) References Cited

U.S. PATENT DOCUMENTS

2020/0177391 A1*  6/2020  Qiu ............... H04L 9/3239
2022/0231869 A1*  7/2022  Liu ............... G06F 16/1837

FOREIGN PATENT DOCUMENTS

| KR | 102137269 B1 | 7/2020 | |
| KR | 102179160    | * 11/2020 | ............... H04L 9/50 |
| KR | 102179160 B1 | 11/2020 | |

\* cited by examiner

*Primary Examiner* — Zhiren Qin
(74) *Attorney, Agent, or Firm* — Thompson Patent Law Offices

(57) ABSTRACT

A method for transmitting specific data whose data format is unknown at a relay from a first blockchain network to a second blockchain network via the relay is provided. The method includes steps of: the relay (a) in response to detecting that a blockchain communication message for transmitting the specific data from the first blockchain network following a first data format to the second blockchain network following a second data format is generated, generating a relay message including the blockchain communication message and verification information; and (b) transmitting the relay message to the second blockchain network, thereby instructing the second blockchain network to (i) verify the relay message by using the verification information included in the relay message and (ii) convert the specific data included in the relay message into the second data format to generate converted specific data and then transmit the converted specific data to a receiving party.

24 Claims, 7 Drawing Sheets

(51) Int. Cl.
*G06Q 20/06* (2012.01)
*G06Q 20/38* (2012.01)
*G06Q 20/40* (2012.01)
*H04L 67/60* (2022.01)
*H04L 69/24* (2022.01)

(52) U.S. Cl.
CPC .......... *G06Q 20/409* (2013.01); *H04L 67/60* (2022.05); *H04L 69/24* (2013.01)

METHOD FOR TRANSMITTING SPECIFIC DATA WHOSE DATA FORMAT IS UNKNOWN AT RELAY FROM FIRST BLOCKCHAIN NETWORK TO SECOND BLOCKCHAIN NETWORK AND RELAY USING THE SAME

CROSS REFERENCE OF RELATED APPLICATION

This present application claims the benefit of the earlier filing date of Korean non-provisional patent application No. 10-2022-0120884, filed Sep. 23, 2022 and Korean non-provisional patent application No. 10-2023-0117826, filed Sep. 5, 2023, the entire contents of which being incorporated herein by reference.

FIELD OF THE DISCLOSURE

The present disclosure relates to a method for transmitting specific data whose data format is unknown at a relay from a first blockchain network to a second blockchain network, and the relay using the same.

BACKGROUND OF THE DISCLOSURE

Blockchain, also known as a public transaction ledger, is a technology capable of preventing hacking that typically occurs during transactions involving cryptocurrencies. While conventional financial companies keep records of the transactions on one or more centralized servers, the blockchain creates blocks through collaborative efforts of all users participating in a blockchain network, and the blocks are verified and approved by all the users to ensure that everyone has the same blocks and to prevent data forgery by some of the users. For example, the blockchain can be applied to Bitcoin, a popular online cryptocurrency. Bitcoin transparently records transactions in a publicly accessible ledger, and multiple computers using Bitcoin verify this record to prevent hacking.

Further, a concept of smart contracts has been proposed to sign and execute various types of contracts, such as those involved in financial transactions, real estate transactions, notarizations, etc. based on the blockchain.

Ethereum, for example, is a blockchain-based smart contract platform capable of forming all types of contracts ranging from financial transactions to other types such as real estate transactions, notarizations, etc.

However, conventionally, blockchain transactions are only able to be executed within a blockchain network from which they are originated, and little was studied about how different types of blockchain networks should communicate with each other.

In relation, the applicant has disclosed technologies for communication between different types of blockchain networks in Korean Application No. 2020-0042242 and Korean Application No. 2020-0076623.

Through the above applications, the technologies required for communication between the different types of blockchain networks are being actively discussed and applied.

In the above applications, a relay has been used as a means to perform communication between the different types of blockchain networks. This method of using the relay presents no particular problem in performing the communication when each of data formats for each of the two blockchain networks involved are known to the relay. However, if one or all of the data formats respectively corresponding to the two blockchain networks is not known to the relay, problems can occur when dApps (i.e., decentralized applications) of the two blockchain networks attempt to encode and/or decode data being transmitted and received between the two blockchain networks.

Since processes of sending messages from a first blockchain network to a second blockchain network or calling APIs of other blockchain networks may incur fees, it is not possible for the relay to know exactly how many APIs of one blockchain network are going to be called by another blockchain network if one or all of the data formats respectively corresponding to the two blockchain networks is not known to the relay. As an example, if the second blockchain network calls all of the APIs, the relay will have to pay all the corresponding fees. However, since the relay does not know the exact APIs to be called, the relay operating such a service of transmitting various messages among the blockchain networks may have to bear extra unnecessary costs.

Therefore, an enhanced method for solving the aforementioned problems is required.

SUMMARY OF THE DISCLOSURE

It is an object of the present disclosure to solve all the aforementioned problems.

It is another object of the present disclosure to provide a method for transmitting specific data, the format of which is unknown at a relay, from a first blockchain network to a second blockchain network via the relay.

It is still another object of the present disclosure to enable each of smart contracts deployed at each of blockchain networks to call a method of a smart contract deployed at another blockchain network to which it does not belong.

It is still yet another object of the present disclosure to transmit a message in a form of raw bytes from the first blockchain network to the second blockchain network via the relay and to allow a user to process the relayed message by using a decoding algorithm of a dApp of the second blockchain network, so that a transaction cost of relaying the message is predictable to a certain level regardless of the method of the smart contract to be called.

In accordance with one aspect of the present disclosure, there is provided a method for transmitting specific data whose data format is unknown at a relay from a first blockchain network to a second blockchain network via the relay, including steps of: (a) in response to detecting that a blockchain communication message for transmitting the specific data from the first blockchain network following a first data format to the second blockchain network following a second data format is generated, generating, by the relay, a relay message including the blockchain communication message and verification information; and (b) transmitting, by the relay, the relay message to the second blockchain network, thereby instructing the second blockchain network to (i) verify the relay message by using the verification information included in the relay message and (ii) convert the specific data included in the relay message into the second data format to generate converted specific data and then transmit the converted specific data to a receiving party.

As one example, before the step of (a), the method further includes a step of: (a0) deploying, by the relay, (i) a first service control smart contract and a first message control smart contract over the first blockchain network, and (ii) a second service control smart contract and a second message control smart contract over the second blockchain network, wherein, at the step of (a), after performing processes of (i) encoding the specific data of the first data format into raw bytes by a first encoding algorithm of a first dApp of the first blockchain network and transmitting a service call message including the raw bytes corresponding to the specific data to the first service control smart contract of the first blockchain network, (ii) transmitting a service message including the service call message by the first service control smart contract to the first message control smart contract of the first blockchain network, and (iii) generating the blockchain communication message including the service message by the first message control smart contract, the relay generates the relay message including the blockchain communication message and the verification information, and wherein, at the step of (b), the relay transmits the relay message to the second blockchain network, to thereby instruct the second blockchain network to (i) receive the relay message by the second message control smart contract, (ii) verify the relay message by using the verification information included in the relay message, (iii) confirm the blockchain communication message included in the relay message, (iv) allow the second service control smart contract to receive the service message included in the blockchain communication message, (v) transmit a call message, notifying an arrival of the service message, to a second dApp of the second blockchain network by the second service control smart contract, (vi) transmit an execution call message, requesting the raw bytes corresponding to the specific data, to the second service control smart contract by the second dApp, and (vii) transmit a handle call message including the raw bytes corresponding to the specific data to the second dApp by the second service control smart contract and decode the raw bytes into the specific data of the second data format by using a second decoding algorithm of the second dApp.

As another example, at the step of (a), (ii) the first dApp requests a relay-relevant fee, for transmission of the raw bytes corresponding to the specific data, to a user of the first dApp, in order to transmit the service message including the service call message to the first message control smart contract of the first blockchain network by the first service control smart contract, and at the step of (b), (vi) the second dApp requests a relay-irrelevant fee, for receipt of the specific data, to a user of the second dApp, in order to transmit the execution call message requesting the raw bytes corresponding to the specific data to the second service control smart contract of the second blockchain network by the second dApp.

As another example, the first service control smart contract is configured to call a second smart contract method of the second blockchain network and the second service control smart contract is configured to call a first smart contract method of the first blockchain network, and the first service control smart contract is managed without knowledge of the second data format of the second blockchain network and the second service control smart contract is managed without knowledge of the first data format of the first blockchain network.

As another example, the service call message additionally includes rollback information to be used for restoring the specific data to a state prior to transmission thereof upon a detection of an error event.

As another example, the blockchain communication message includes (i) a source address corresponding to a blockchain address of the first message control smart contract which has generated the blockchain communication message, (ii) a destination address corresponding to a blockchain address of the second message control smart contract which will receive the blockchain communication message, (iii) a service type identifying a type of a service of the service message, (iv) a serial number identifying the blockchain communication message, and (v) the service message.

As another example, at the step of (a), after performing processes of (i) encoding the specific data of the first data format into the raw bytes by the first encoding algorithm of the first dApp of the first blockchain network and transmitting the service call message including the raw bytes corresponding to the specific data to the first service control smart contract of the first blockchain network, (ii) upon the service call message being received by the first service control smart contract, (ii-1) responding to the first dApp with a serial number for identification of the service call message, (ii-2) generating the service message including the service call message, (ii-3) generating a transmission service message including the service message, and (ii-4) transmitting the transmission service message to the first message control smart contract of the first blockchain network, and (iii) upon the transmission service message being received by the first message control smart contract of the first blockchain network, (iii-1) generating the blockchain communication message including the service message, and (iii-2) generating a blockchain event message including the blockchain communication message, the relay generates the relay message including the blockchain communication message and the verification information.

As another example, the transmission service message includes (i) a destination network address corresponding to information on a network address of the second blockchain network which will receive the service message, (ii) a service type identifying a type of a service of the service message, (iii) a serial number identifying the transmission service message, and (iv) the service message.

As another example, the blockchain event message includes (i) a destination address corresponding to information on a blockchain address of the second message control smart contract of the second blockchain network to which the blockchain communication message will be transmitted, (ii) the serial number for identifying the service call message at the first blockchain network, and (iii) the blockchain communication message.

As another example, at the step of (b), the relay transmits a handle relay message including the relay message to the second blockchain network, to thereby instruct the second blockchain network to (i) receive the handle relay message by the second message control smart contract, (ii) (ii-1) generate a verification handle relay message including the relay message and transmit thereof to a second message verification smart contract of the second blockchain network, and (ii-2) verify the verification information included in the relay message in response to the verification handle relay message being received by the second message verification smart contract, (iii) upon confirming by the second message control smart contract that the relay message is successfully verified by the second message verification smart contract, confirm the blockchain communication message included in the relay message, (iv) generate a handle service message included in the service message included in the blockchain communication message and allow the second service control smart contract to receive thereof, (v) upon handle service message being received by the second service control smart contract, confirm the service message included in the handle service message and allow the call message, notifying the arrival of the service message, to be transmitted to the second dApp of the second blockchain network by the second service control smart contract, (vi) upon the call message being detected by the second dApp, transmit the execution call message, requesting the raw bytes corresponding to the specific data, to the second service control smart contract by the second dApp, and (vii) upon the execution call message being received by the second service control smart contract, transmit the handle call message including the raw bytes corresponding to the specific data to the second dApp by the second service control smart contract and decode the raw bytes into the specific data of the second data format by using the second decoding algorithm of the second dApp.

As another example, the verification handle relay message includes (i) a blockchain address of the second message control smart contract which will receive the handle relay message, (ii) a blockchain address of the first message control smart contract which has generated the blockchain communication message, (iii) a serial number identifying the verification handle relay message, and (iv) the relay message.

As another example, the handle service message includes (i) a network address of the first blockchain network which has transmitted the service message, (ii) a service type identifying a type of a service of the service message, (iii) a serial number identifying the handle service message, and (iv) the service message.

As another example, the call message includes (i) an origin address which is a blockchain address, on the first blockchain network, corresponding to an account transmitting the specific data, (ii) a destination address, which is a blockchain address, on the second blockchain network, corresponding to an account receiving the call message, (iii) a serial number identifying the service call message at the first blockchain network, (iv) identification information identifying a request for transmission of data at the second blockchain network, and (v) the specific data.

In accordance with another aspect of the present disclosure, there is provided a relay for transmitting specific data whose data format is unknown at the relay from a first blockchain network to a second blockchain network, including: at least one memory that stores instructions; and at least one processor configured to execute the instructions to perform or support another device to perform: (I) in response to detecting that a blockchain communication message for transmitting the specific data from the first blockchain network following a first data format to the second blockchain network following a second data format is generated, a process of generating a relay message including the blockchain communication message and verification information; and (II) a process of transmitting the relay message to the second blockchain network, thereby instructing the second blockchain network to (i) verify the relay message by using the verification information included in the relay message and (ii) convert the specific data included in the relay message into the second data format to generate converted specific data and then transmit the converted specific data to a receiving party.

As another example, before the process of (I), the processor further performs a process of: (I0) deploying (i) a first service control smart contract and a first message control smart contract over the first blockchain network, and (ii) a second service control smart contract and a second message control smart contract over the second blockchain network, wherein, at the process of (I), after performing processes of (i) encoding the specific data of the first data format into raw bytes by a first encoding algorithm of a first dApp of the first blockchain network and transmitting a service call message including the raw bytes corresponding to the specific data to the first service control smart contract of the first blockchain network, (ii) transmitting a service message including the service call message by the first service control smart contract to the first message control smart contract of the first blockchain network, and (iii) generating the blockchain communication message including the service message by the first message control smart contract, the processor generates the relay message including the blockchain communication message and the verification information, and wherein, at the process of (II), the processor transmits the relay message to the second blockchain network, to thereby instruct the second blockchain network to (i) receive the relay message by the second message control smart contract, (ii) verify the relay message by using the verification information included in the relay message, (iii) confirm the blockchain communication message included in the relay message, (iv) allow the second service control smart contract to receive the service message included in the blockchain communication message, (v) transmit a call message, notifying an arrival of the service message, to a second dApp of the second blockchain network by the second service control smart contract, (vi) transmit an execution call message, requesting the raw bytes corresponding to the specific data, to the second service control smart contract by the second dApp, and (vii) transmit a handle call message including the raw bytes corresponding to the specific data to the second dApp by the second service control smart contract and decode the raw bytes into the specific data of the second data format by using a second decoding algorithm of the second dApp.

As another example, at the process of (I), (ii) the first dApp requests a relay-relevant fee, for transmission of the raw bytes corresponding to the specific data, to a user of the first dApp, in order to transmit the service message including the service call message to the first message control smart contract of the first blockchain network by the first service control smart contract, and at the process of (II), (vi) the second dApp requests a relay-irrelevant fee, for receipt of the specific data, to a user of the second dApp, in order to transmit the execution call message requesting the raw bytes corresponding to the specific data to the second service control smart contract of the second blockchain network by the second dApp.

As another example, the first service control smart contract is configured to call a second smart contract method of the second blockchain network and the second service control smart contract is configured to call a first smart contract method of the first blockchain network, and wherein the first service control smart contract is managed without knowledge of the second data format of the second blockchain network and the second service control smart contract is managed without knowledge of the first data format of the first blockchain network.

As another example, the service call message additionally includes rollback information to be used for restoring the specific data to a state prior to transmission thereof upon a detection of an error event.

As another example, the blockchain communication message includes (i) a source address corresponding to a blockchain address of the first message control smart contract which has generated the blockchain communication message, (ii) a destination address corresponding to a blockchain address of the second message control smart contract which will receive the blockchain communication message, (iii) a service type identifying a type of a service of the service message, (iv) a serial number identifying the blockchain communication message, and (v) the service message.

As another example, at the process of (I), after performing processes of (i) encoding the specific data of the first data format into the raw bytes by the first encoding algorithm of the first dApp of the first blockchain network and transmitting the service call message including the raw bytes corresponding to the specific data to the first service control smart contract of the first blockchain network, (ii) upon the service call message being received by the first service control smart contract, (ii-1) responding to the first dApp with a serial number for identification of the service call message, (ii-2) generating the service message including the service call message, (ii-3) generating a transmission service message including the service message, and (ii-4) transmitting the transmission service message to the first message control smart contract of the first blockchain network, and (iii) upon the transmission service message being received by the first message control smart contract of the first blockchain network, (iii-1) generating the blockchain communication message including the service message, and (iii-2) generating a blockchain event message including the blockchain communication message, the processor generates the relay message including the blockchain communication message and the verification information.

As another example, the transmission service message includes (i) a destination network address corresponding to information on a network address of the second blockchain network which will receive the service message, (ii) a service type identifying a type of a service of the service message, (iii) a serial number identifying the transmission service message, and (iv) the service message.

As another example, the blockchain event message includes (i) a destination address corresponding to information on a blockchain address of the second message control smart contract of the second blockchain network to which the blockchain communication message will be transmitted, (ii) the serial number for identifying the service call message at the first blockchain network, and (iii) the blockchain communication message.

As another example, at the process of (II), the processor transmits a handle relay message including the relay message to the second blockchain network, to thereby instruct the second blockchain network to (i) receive the handle relay message by the second message control smart contract, (ii) (ii-1) generate a verification handle relay message including the relay message and transmit thereof to a second message verification smart contract of the second blockchain network, and (ii-2) verify the verification information included in the relay message in response to the verification handle relay message being received by the second message verification smart contract, (iii) upon confirming by the second message control smart contract that the relay message is successfully verified by the second message verification smart contract, confirm the blockchain communication message included in the relay message, (iv) generate a handle service message included in the service message included in the blockchain communication message and allow the second service control smart contract to receive thereof, (v) upon handle service message being received by the second service control smart contract, confirm the service message included in the handle service message and allow the call message, notifying the arrival of the service message, to be transmitted to the second dApp of the second blockchain network by the second service control smart contract, (vi) upon the call message being detected by the second dApp, transmit the execution call message, requesting the raw bytes corresponding to the specific data, to the second service control smart contract by the second dApp, and (vii) upon the execution call message being received by the second service control smart contract, transmit the handle call message including the raw bytes corresponding to the specific data to the second dApp by the second service control smart contract and decode the raw bytes into the specific data of the second data format by using the second decoding algorithm of the second dApp.

As another example, the verification handle relay message includes (i) a blockchain address of the second message control smart contract which will receive the handle relay message, (ii) a blockchain address of the first message control smart contract which has generated the blockchain communication message, (iii) a serial number identifying the verification handle relay message, and (iv) the relay message.

As another example, wherein the handle service message includes (i) a network address of the first blockchain network which has transmitted the service message, (ii) a service type identifying a type of a service of the service message, (iii) a serial number identifying the handle service message, and (iv) the service message.

As another example, the call message includes (i) an origin address which is a blockchain address, on the first blockchain network, corresponding to an account transmitting the specific data, (ii) a destination address, which is a blockchain address, on the second blockchain network, corresponding to an account receiving the call message, (iii) a serial number identifying the service call message at the first blockchain network, (iv) identification information identifying a request for transmission of data at the second blockchain network, and (v) the specific data.

In addition, recordable media that are readable by a computer for storing a computer program to execute the method of the present disclosure is further provided.

DETAILED DESCRIPTION OF THE PREFERRED EMBODIMENTS

Figure 1:
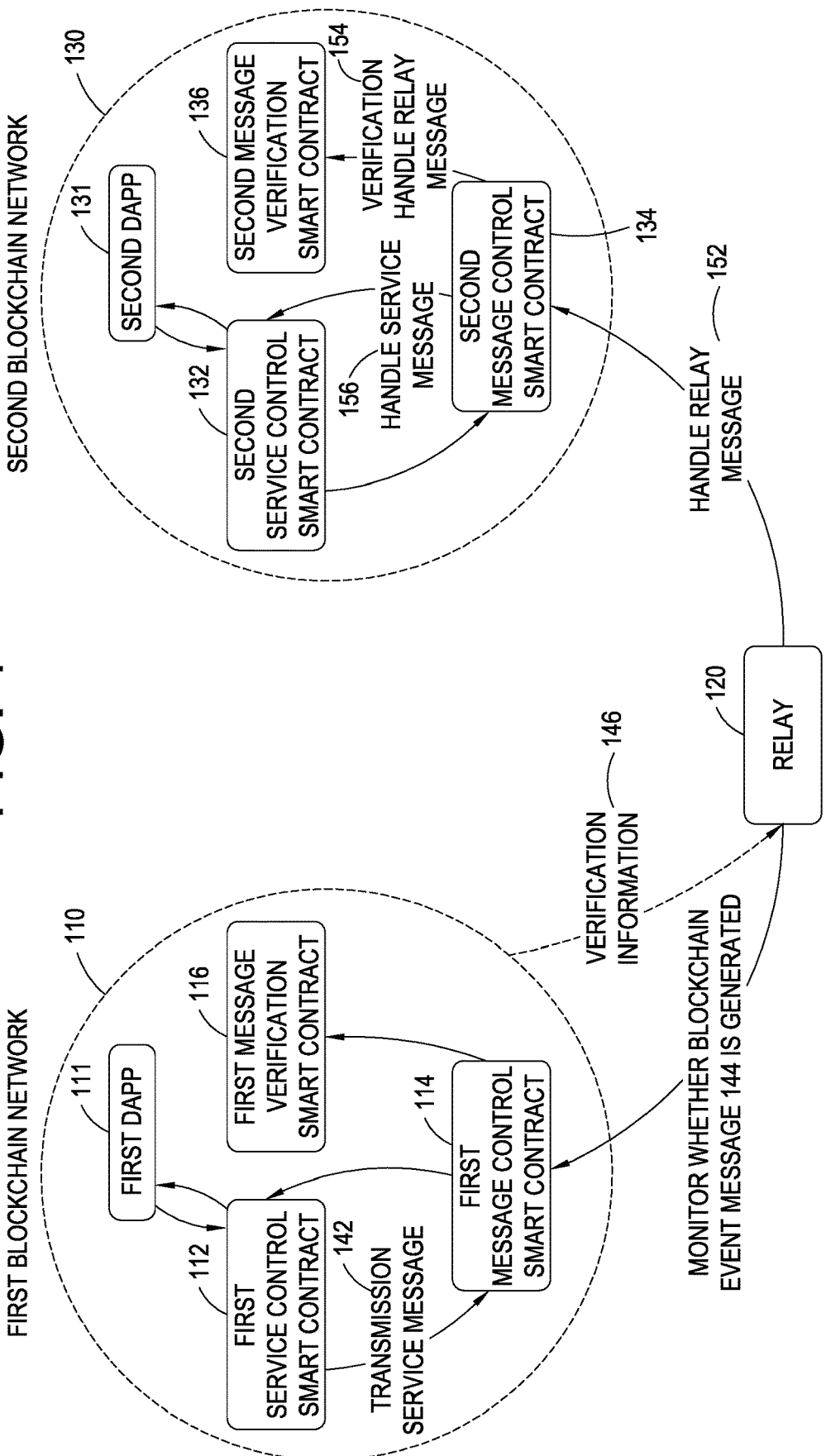
FIG. 1 is a drawing schematically illustrating an overall system of transmitting and receiving specific data between blockchains in accordance with one example embodiment of the present disclosure.

Hereinafter, embodiments are described in detail by referring to the accompanying drawings. However, various modifications may be made to the embodiments and the scope of the claims of the patent application is not limited or defined by these embodiments. It is to be understood that all modifications, equivalents or substitutions to the embodiments are included in the scope of the claims.

The terminology in the embodiments is used for illustrative purposes only and should not be construed as limiting the scope of the claims. Expressions in the singular include the plural unless the context clearly indicates otherwise. In this specification, the terms "includes" or "has" and the like are intended to designate the presence of the features, numbers, steps, actions, components, parts, or combinations thereof described, and are not to be understood as precluding the possibility of the presence or the addition of one or more other features, numbers, steps, actions, components, parts, or combinations thereof.

Unless otherwise defined, all terms used herein, including technical or scientific terms, have the same meaning as commonly understood by one of those ordinary skilled in the technical field to which the embodiments belong. Such terms, as defined in commonly used dictionaries, are to be construed to have a meaning consistent with their meaning in the context of the relevant art and are not to be construed in an idealized or overly formal sense unless expressly defined in this disclosure.

In addition, when describing the accompanying drawings, identical components are given the same reference numerals, and duplicate descriptions thereof are omitted. In describing the embodiments, if it is determined that a detailed description of the related prior art would unnecessarily obscure the essence of the embodiments, the detailed description is omitted.

In addition, terms such as first, second, A, B, (a), (b), and the like may be used to describe components of an embodiment. Such terms are intended only to distinguish one component from another, and the nature, sequence, or order of such components is not limited by such terms. Where a component is described as being "connected," "coupled," or "attached" to another component, it is to be understood that the component may be directly or indirectly connected or attached to the other component.

Components included in one embodiment, and components having common features, are described using the same terms in other embodiments. Unless otherwise indicated, the description of one embodiment is applicable to other embodiments, and specific descriptions are omitted to the extent that they are redundant.

Hereinafter, a system and a method for transmitting data between blockchains in accordance with one example embodiment of the present disclosure are described in detail by referring to the attached FIGS. 1 to 7.

FIG. 1 is a drawing schematically illustrating an overall system of transmitting and receiving specific data between blockchains in accordance with one example embodiment of the present disclosure.

By referring to FIG. 1, the overall system of the present disclosure may be configured to include a first blockchain network 110, a second blockchain network 130 and a relay 120.

The first blockchain network 110 may support operations of a first dApp (decentralized application) 111, a first service control smart contract 112, a first message control smart contract 114 and a first message verification smart contract 116.

The second blockchain network 130 may support operations of a second dApp 131, a second service control smart contract 132, a second message control smart contract 134 and a second message verification smart contract 136.

Herein, decentralized applications, i.e. the first dApp 111 and the second dApp 131 may be applications in charge of interactions with one or more users.

Also, each of the decentralized applications may perform encoding and decoding of data depending on formats of the data it transmits or receives.

In an example of transmitting the data from the first blockchain network 110 to the second blockchain network 130, it may operate as follows. Herein, it is assumed that the specific data is to be transmitted from the first blockchain network 110, which follows a first data format, to the second blockchain network 130, which follows a second data format, and that the relay 120 is not aware of the first data format of the first blockchain network 110 and/or the second data format of the second blockchain network 130. Furthermore, in the present disclosure, the relay 120 may be narrowly interpreted to mean a relay per se, but may also be broadly interpreted to include an entity interfacing with the relay per se (e.g., an entity which serves as an operating device for managing the relay). The relay 120 may include an entity that manages contracts and an entity that performs the relaying, but is not limited thereto.

Upon acquiring a service call message including specific data to be transmitted from the first blockchain network 110 to the second blockchain network 130, the first blockchain network 110 may generate a service message including the service call message and service information of the service call message, and generate a blockchain communication message including the service message.

In response to detecting generation of the blockchain communication message while monitoring of the first blockchain network 110, the relay 120 may acquire verification information 146, to be used for verifying the blockchain communication message, from the first blockchain network 110, generate a relay message including the blockchain communication message and the verification information 146, and transmit the relay message to the second blockchain network 130 where a destination of the message is located.

Herein, the verification information 146 refers to a set of data that can prove that the blockchain communication message is derived from a particular block on a blockchain. Also, the verification information 146 may be defined differently for different blockchains.

A representative example of the verification information 146 may be data related to an end of a Merkle Tree connected from a block header, and to serve as proofs, the verification information 146 may be data of all the entities connected from a root of the Merkle Tree or hash values of siblings.

Meanwhile, as another example of the verification information 146, data from an entity that is associated with a Merkle Patricia Tree (MPT) can be used to prove the verification information 146. The verification information 146 may be obtained by calling, with a key value of the data, an application program interface (API) from a specific account.

Upon receiving the relay message, the second blockchain network 130 may verify the relay message by using the verification information 146 contained in the relay message, and transmit the specific data contained in the relay message to a receiving party via the second dApp 131.

In detail, the relay 120 may deploy the first service control smart contract 112, the first message control smart contract 114 and the like to the first blockchain network 110 and deploy the second service control smart contract 132, the second message control smart contract 134 and the like to the second blockchain network 130, thereby setting preconditions required for important characteristics of the present disclosure described below, e.g., characteristics of the relay 120 capable of transmitting and receiving the specific data between the heterogeneous blockchains without any problems despite not knowing the first data format and the second data format.

In such a state, after performing processes of (i) encoding the specific data of the first data format into raw bytes by a first encoding algorithm of the first dApp 111 of the first blockchain network 110 and transmitting the service call message including the raw bytes corresponding to the specific data to the first service control smart contract 112 of the first blockchain network 110, (ii) transmitting the service message including the service call message to the first message control smart contract 114 of the first blockchain network 110 by the first service control smart contract 112, and (iii) generating the blockchain communication message including the service message by the first message control smart contract 114, the relay 120 may generate the relay message including the blockchain communication message and the verification information 146.

Herein, at the process (ii) above, the first dApp 111 may request a first fee, i.e. a relay-relevant fee, to a user of the first dApp 111 as a fee for transmission of the raw bytes corresponding to the specific data, in order to transmit the service message including the service call message to the first message control smart contract 114 of the first blockchain network 110 by the first service control smart contract 112.

Afterwards, the relay 120 may transmit the relay message to the second blockchain network 130, to thereby instruct the second blockchain network 130 to (i) receive the relay message by the second message control smart contract 134, (ii) verify the relay message by using the verification information 146 included in the relay message, (iii) confirm the blockchain communication message included in the relay message, (iv) allow the second service control smart contract 132 to receive the service message included in the blockchain communication message, (v) transmit a call message, notifying an arrival of the service message, to the second dApp 131 of the second blockchain network 130 by the second service control smart contract 132, (vi) transmit an execution call message, requesting the raw bytes corresponding to the specific data, to the second service control smart contract 132 by the second dApp 131, and (vii) transmit a handle call message including the raw bytes corresponding to the specific data to the second dApp 131 by the second service control smart contract 132 and decode the raw bytes into the specific data of the second data format by using a second decoding algorithm of the second dApp 131.

Herein, at the process (vi) above, the second dApp 131 may request a second fee, i.e. a relay-irrelevant fee, to a user of the second dApp 131 as a fee for receipt of the specific data, in order to transmit the execution call message requesting the raw bytes corresponding to the specific data to the second service control smart contract 132 of the second blockchain network 130 by the second dApp 131.

Also, herein, the first service control smart contract 112 may be configured to call a second smart contract method of the second blockchain network 130 and the second service control smart contract 132 may be configured to call a first smart contract method of the first blockchain network 110. Further, the first service control smart contract 112 may be managed to interface with the relay 120 without knowledge of the second data format of the second blockchain network 130 and the second service control smart contract may be managed to interface with the relay 120 without knowledge of the first data format of the first blockchain network 110.

Figure 2:
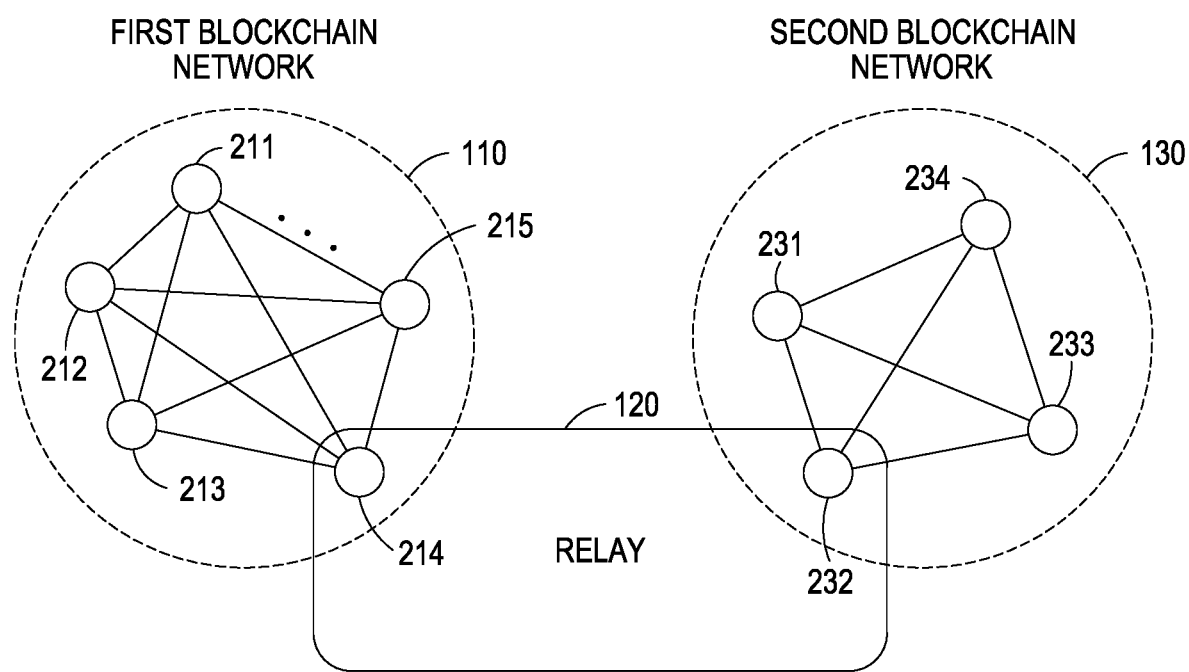
FIG. 2 is a drawing schematically illustrating an arrangement of nodes in the overall system in accordance with one example embodiment of the present disclosure.

FIG. 2 is a drawing schematically illustrating an arrangement of nodes in the overall system in accordance with one example embodiment of the present disclosure.

By referring to FIG. 2, the system of the present disclosure may include the first blockchain network 110 having a plurality of nodes 211-215, the second blockchain network 130 having a plurality of nodes 231-234, and the relay 120 that relays communications between the first blockchain network 110 and the second blockchain network 130.

Herein, the relay 120 may include the node 214 of the first blockchain network 110 and the node 232 of the second blockchain network 130.

That is, the node 214 may be configured to be included in both the first blockchain network 110 and the relay 120, and the node 232 may be configured to be included in both the second blockchain network 130 and the relay 120.

Alternatively, the relay 120 may be configured to not include a node of the first blockchain network 110 and/or a node of the second blockchain network 130, but to be in communication with at least one node of the first blockchain network 110 and at least one node of the second blockchain network 130.

More specific examples of transmitting and receiving data between the blockchains will be described in more detail hereinafter by referring to FIGS. 3 to 7.

Figure 3:
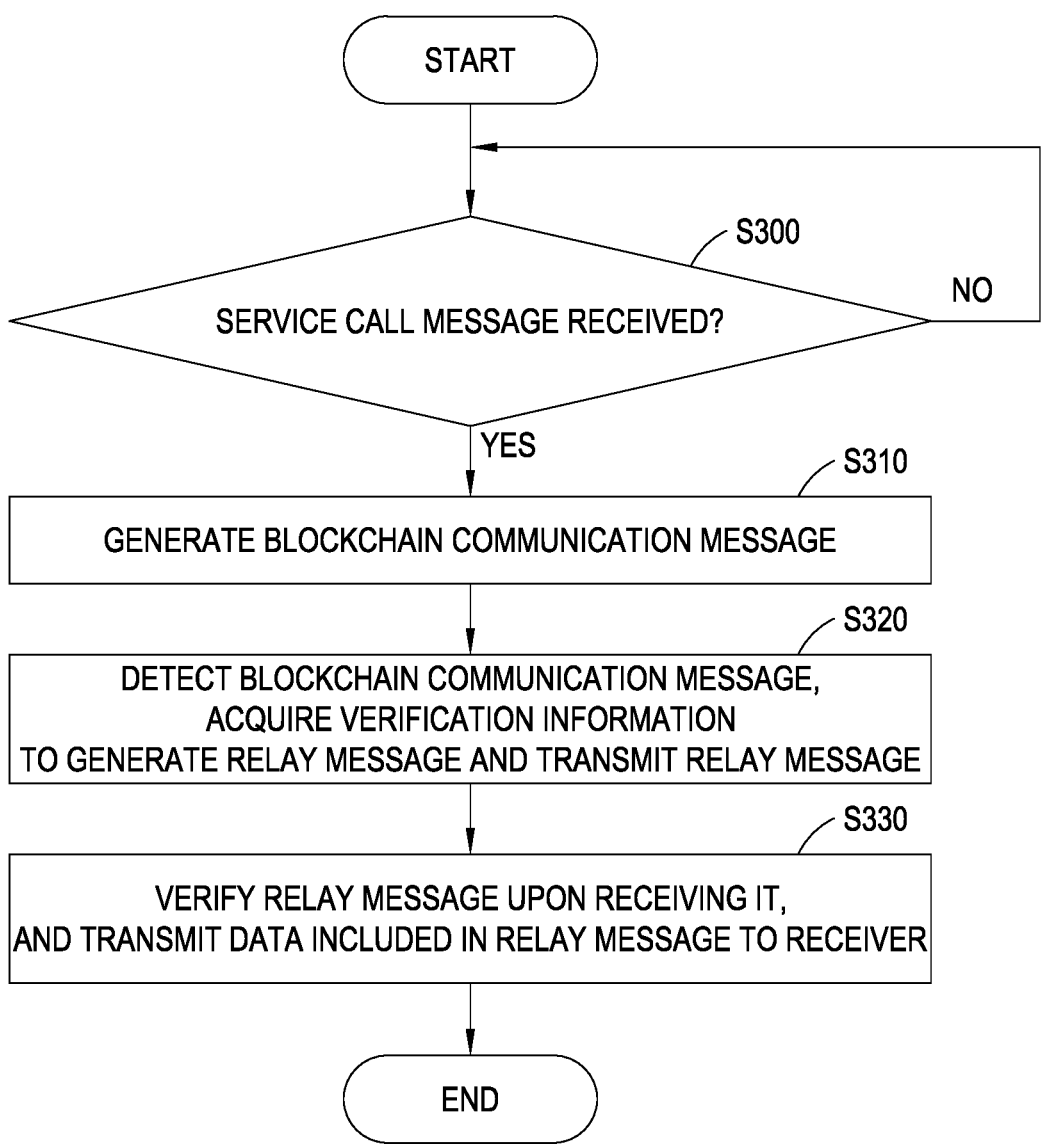
FIG. 3 is a flow diagram schematically illustrating a process of transmitting and receiving the specific data between the blockchains in accordance with one example embodiment of the present disclosure.

FIG. 3 is a flow diagram schematically illustrating a process of transmitting and receiving the specific data between the blockchains in accordance with one example embodiment of the present disclosure.

By referring to FIG. 3, upon receiving the service call message, including the specific data to be transmitted to the second blockchain network 130 from the first blockchain network 110 at a step of S300, the service message including the service call message and the service information of the service call message may be generated, and then the blockchain communication message including the service message may be generated at a step of S310. The step of S310 will be described in more detail hereinafter by referring to FIG. 4.

When the generation of the blockchain communication message is detected by the relay 120 which monitors the first blockchain network 110, the relay 120 may acquire the verification information 146, to be used for verifying the blockchain communication message, from the first blockchain network 110, generate the relay message including the blockchain communication message and the verification information 146, and transmit the relay message to the second blockchain network 130 at a step of S320. Herein, the destination of the message is located at the second blockchain network 130. The step of S320 will be described in more detail hereinafter by referring to FIG. 5.

Then, upon receipt of the relay message at the second blockchain network 130, the second blockchain network 130 may verify the relay message by using the verification information 146 included in the relay message and transmit the specific data included in the relay message to the receiving party, at a step of S330. The step of S330 will be described in more detail hereinafter by referring to FIG. 6.

Figure 4:
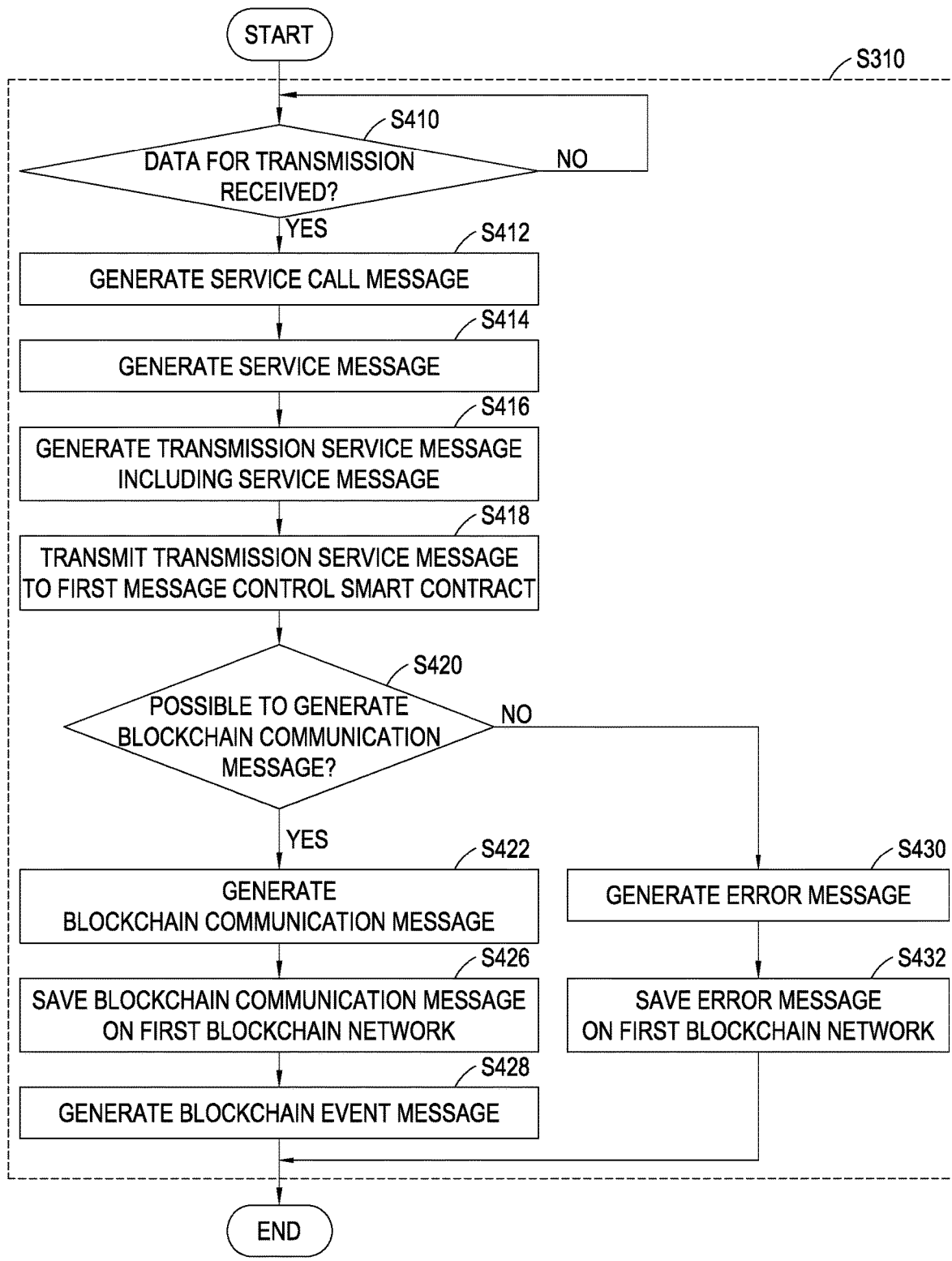
FIG. 4 is a flow diagram schematically illustrating a process of transmitting the specific data from a first blockchain network in the system in accordance with one example embodiment of the present disclosure.

FIG. 4 is a flow diagram schematically illustrating a process of transmitting the specific data from the first blockchain network 110 in the system in accordance with one example embodiment of the present disclosure.

By referring to FIG. 4, the step of S310 in FIG. 3 may specifically be provided as follows.

In response to receiving the specific data, to be transmitted to the second blockchain network 130, from a user, i.e., a sending party, of the first dApp 111 at a step of S410, the first dApp 111 of the first blockchain network 110 may generate the service call message including the specific data at a step of S412.

Herein, the service call message may be configured to include the specific data to be transmitted and a destination address corresponding to a blockchain address of an account which will receive the specific data at the second blockchain network 130. In addition, the service call message may optionally include rollback information to be used for restoring the specific data to a state prior to transmission thereof upon a detection of an error event.

When the user provides the specific data to the first service control smart contract 112 via the first dApp 111 by transmitting the service call message, the first DApp 111 may request the user to pay for the first fee as a fee for transmitting the specific data.

In response to receiving the service call message from the first dApp 111, the first service control smart contract 112 may respond to the first dApp 111 with a serial number for identifying the service call message, and generate the service message including the service call message at a step of S414.

The service message may include the service call message and a destination address corresponding to a blockchain address of an account which will receive the service call message.

Alternatively, the service message may further include at least one of the following: a message type identifying a type of the service call message, a service type, service information including details of the service type, and a source address corresponding to a blockchain address of an account transmitting the service call message, in addition to the service call message and the destination address corresponding to the blockchain address of the account which will receive the service call message.

Herein, the blockchain address may include communication protocol identification information indicating that the blockchain address is an address for blockchain communication, blockchain type information distinguishing a type of blockchain network, blockchain identification information identifying a blockchain among the same type of blockchain network, and account identification information identifying a specific account in a blockchain network.

For example, the blockchain address may have a form of "btp://0x3.iconee/hx1234~".

Herein, 'btp://' is the communication protocol identification information indicating that the blockchain address is the address for blockchain communication, '0x3' is the blockchain identification information identifying the blockchain among the same type of blockchain network, 'iconee' is the blockchain type information distinguishing the type of blockchain network, and 'hx1234~' is the account identification information identifying the specific account in the blockchain network.

Next, the first service control smart contract 112 of the first blockchain network 110 may generate a transmission service message 142 including the service message at a step of S416.

Herein, the transmission service message 142 may include a destination network address corresponding to information on a network address of the second blockchain network 130 which will receive the service message, the service type identifying a type of a service of the service message, a serial number identifying the transmission service message 142, and the service message.

Then, the first service control smart contract 112 of the first blockchain network 110 may transmit the transmission service message 142 to the first message control smart contract 114 of the first blockchain network 110 at a step of S418.

Receiving the transmission service message 142 thereupon, the first message control smart contract 114 of the first blockchain network 110 may determine whether it is possible to generate the blockchain communication message at a step of S420.

If it is determined at the step of S420 that the blockchain communication message can be generated, the first message control smart contract 114 of the first blockchain network 110 may generate the blockchain communication message including the service message at a step of S422.

Herein, the blockchain communication message may include a source address corresponding to a blockchain address of the first message control smart contract 114 which has generated the blockchain communication message, a destination address corresponding to a blockchain address of the second message control smart contract 134 which will receive the blockchain communication message, the service type identifying the type of the service of the service message, a serial number identifying the blockchain communication message, and the service message.

Afterwards, the first message control smart contract 114 of the first blockchain network 110 may add the blockchain communication message to a first blockchain of the first blockchain network 110 at a step of S426.

Then, the first message control smart contract 114 of the first blockchain network 110 may generate a blockchain event message 144 including the blockchain communication message at a step of S428.

Herein, the blockchain event message 144 may include the destination address corresponding to information on the blockchain address of the second message control smart contract 134 of the second blockchain network 130 to which the blockchain communication message will be transmitted, a serial number for identifying the blockchain event message and determining its order, and a byte-to-byte alteration of the blockchain communication message.

If it is determined at the step of S420 that the blockchain communication message cannot be generated, the first message control smart contract 114 of the first blockchain network 110 may generate an error message at a step of S430. For example, in case the destination address cannot be recognized, the blockchain communication message cannot be generated.

Then, the first message control smart contract 114 of the first blockchain network 110 may add the error message to the first blockchain of the first blockchain network 110 at a step of S432.

Figure 5:
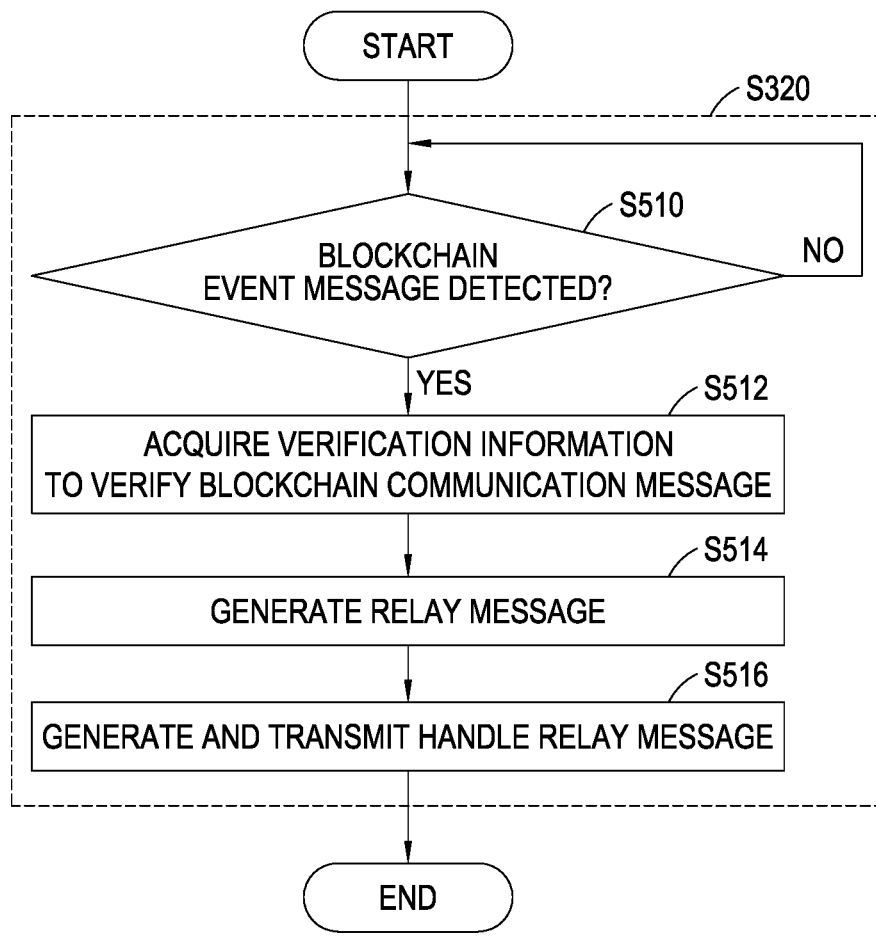
FIG. 5 is a flow diagram schematically illustrating a process of transmitting the specific data via a relay of the system in accordance with one example embodiment of the present disclosure.

FIG. 5 is a flow diagram schematically illustrating a process of transmitting the specific data via the relay of the system in accordance with one example embodiment of the present disclosure.

By referring to FIG. 5, the step of S320 in FIG. 3 may specifically be provided as follows.

When the generation of the blockchain event message 144 including the blockchain communication message is detected by the relay 120 (while the relay 120 is monitoring the first blockchain network 110) at a step of S510, the relay 120 may acquire the verification information 146, to be used for verifying the blockchain communication message, from the first blockchain network 110 at a step of S512.

Next, the relay 120 may generate the relay message including the blockchain communication message and the verification information 146 at a step of S514. Herein, the relay message may include at least one blockchain communication message sharing the same network address, and the verification information 146 of the blockchain communication message.

Then, the relay 120 may generate a handle relay message 152 including the relay message and transmit the handle relay message 152 to the second message control smart contract 134 of the second blockchain network 130 at a step of S516.

Herein, the handle relay message 152 may include the blockchain address of the first message control smart contract 114 that has generated the blockchain communication message and the relay message converted to the raw bytes.

Figure 6:
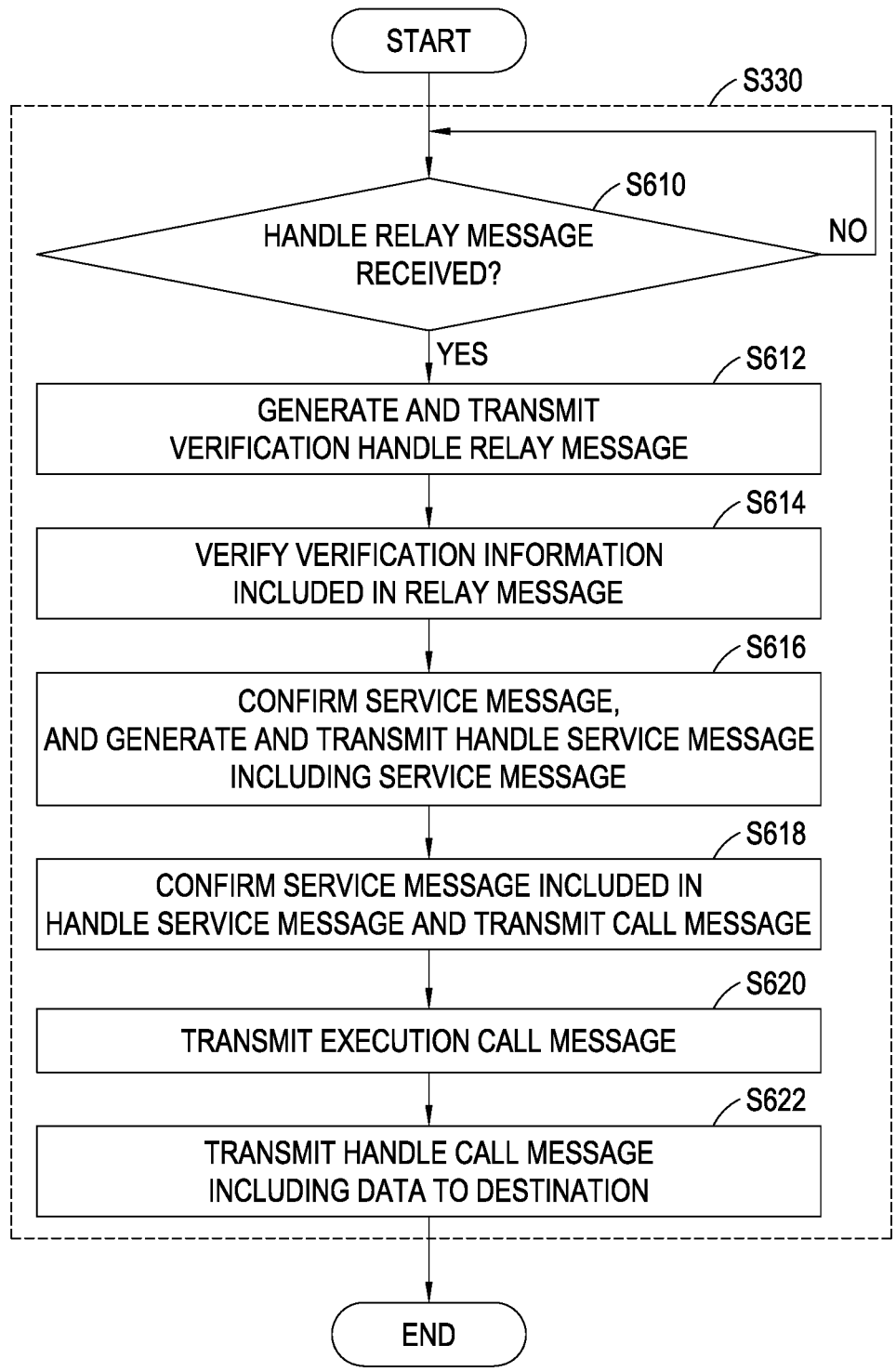
FIG. 6 is a flow diagram schematically illustrating a process of transmitting the specific data to a final destination of a second blockchain network in accordance with one example embodiment of the present disclosure.

FIG. 6 is a flow diagram schematically illustrating a process of transmitting the specific data to a final destination of the second blockchain network in accordance with one example embodiment of the present disclosure.

By referring to FIG. 6, the step of S330 in FIG. 3 may specifically be provided as follows.

Upon receiving the handle relay message 152 including the relay message from the relay 120 at a step of S610, the second message control smart contract 134 of the second blockchain network 130 may generate a verification handle relay message 154 including the relay message and transmit the verification handle relay message 154 to the second message verification smart contract 136 of the second blockchain network 130 at a step of S612.

Herein, the verification handle relay message 154 may include the blockchain address of the second message control smart contract 134 which will receive the handle relay message, the blockchain address of the first message control smart contract 114 which has generated the blockchain communication message, an address where the first message control smart contract 114 has been executed, a serial number identifying the verification handle relay message 154, and the relay message converted into the raw bytes.

In response to receiving the verification handle relay message 154, the second message verification smart contract 136 of the second blockchain network 130 may verify the verification information 146 included in the relay message at a step of S614.

When the second message control smart contract 134 of the second blockchain network 130 confirms that the relay message has been successfully verified by the second message verification smart contract 136, the second message control smart contract 134 may confirm the blockchain communication message included in the relay message, confirm the service message included in the blockchain communication message, generate a handle service message 156 including the service message and transmit the handle service message 156 to the second service control smart contract 132 of the second blockchain network 130 at a step of S616.

Herein, the handle service message 156 may include a network address of the first blockchain network 110 which has transmitted the service message, the service type identifying the type of the service of the service message, a serial number identifying the handle service message, and the service message.

Once the handle service message 156 is received, the second message control smart contract 134 may confirm the service message included in the handle service message 156, and transmit the call message, notifying the arrival of the service message, to the second dApp 131 of the second blockchain network 130 at a step of S618. Herein, the call message may include (i) a origin address which is a blockchain address, on the first blockchain network 110, corresponding to an account transmitting the specific data, (ii) a destination address, which is a blockchain address, on the second blockchain network 130, corresponding to an account receiving the call message, (iii) the serial number identifying the service call message at the first blockchain network 110, (iv) identification information identifying a request for transmission of the specific data at the second blockchain network 130, and (v) the specific data.

When the second dApp 131 detects the call message, the second dApp 131 may transmit the execution call message, requesting the specific data, to the second service control smart contract 132 at a step of S620. Herein, the execution call message may include the identification information identifying the request for transmission of the specific data at the second blockchain network 130.

When the second dApp 131 transmits the execution call message, requesting the specific data, to the second service control smart contract 132 at the step of S620, the second dApp 131 may request a user, i.e., a receiving party, to pay for the second fee as a fee for receiving the specific data. Herein, the sending party and the receiving party may be different, but it is not limited thereto. That is, the sending party and the receiving party may be the same person as the case may be.

In response to receiving the execution call message, the second service control smart contract 132 may transmit the handle call message including the specific data to the second dApp 131, and then the second dApp 131 may transmit the specific data included in the handle call message to the user of the second dApp 131 at a step of S622. The handle call message may include the specific data and the origin address which is the blockchain address, on the first blockchain network 110, corresponding to the account transmitting the specific data.

Figure 7:
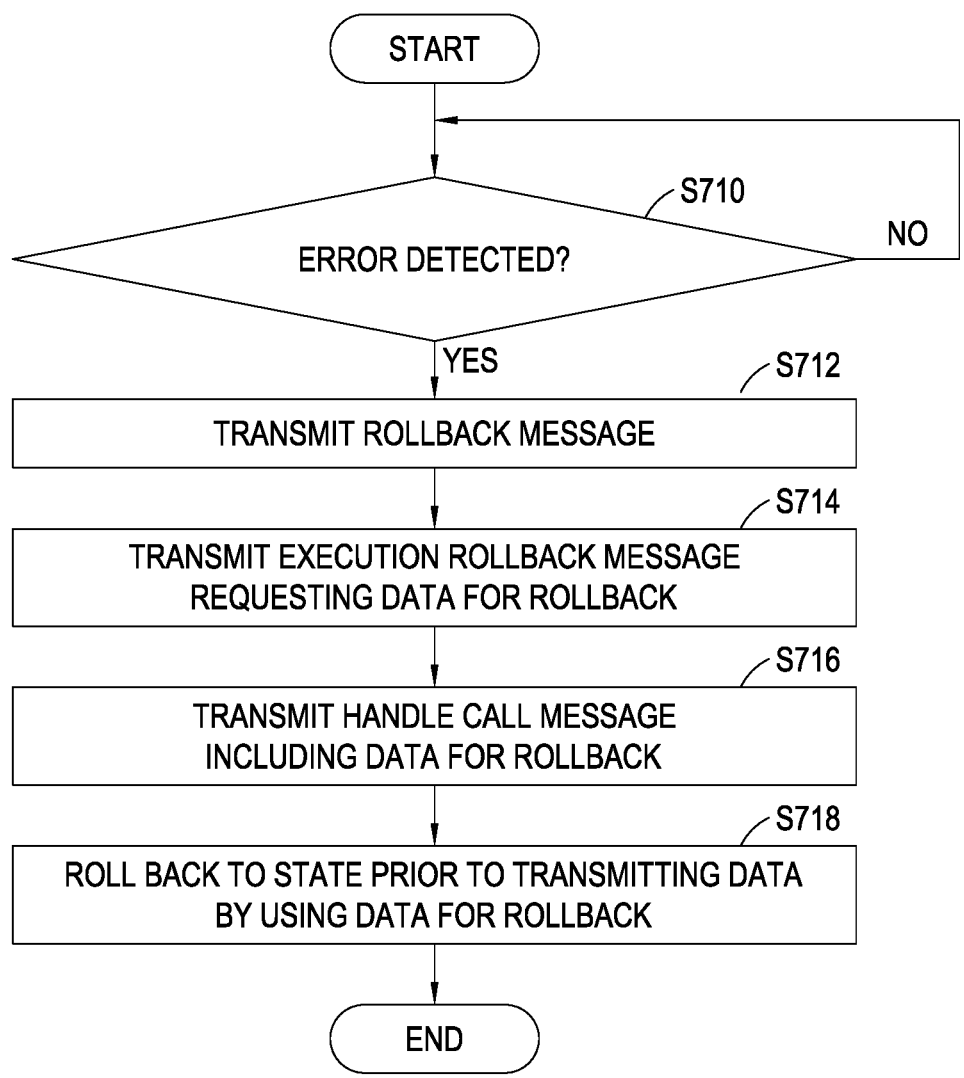
FIG. 7 is a flow diagram schematically illustrating a process of handling errors in the system in accordance with one example embodiment of the present disclosure.

FIG. 7 is a flow diagram schematically illustrating a process of handling errors in the system in accordance with one example embodiment of the present disclosure.

By referring to FIG. 7, upon detecting that an error event has occurred in the transmission of the blockchain communication message at a step of S710, the first service control smart contract 112 may transmit a rollback message, informing of the occurrence of the error event, to the first dApp 111 at a step of S712. Herein, the rollback message may include the serial number for identifying the service call message at the first blockchain network 110, the rollback information to be used for restoring the specific data to the state prior to transmission thereof upon the detection of the error event, and error information that has caused the rollback.

In response to receiving the rollback message, the first dApp 111 may transmit an execution rollback message, requesting data for rollback, to the first service control smart contract 112 at a step of S714. Herein, the execution rollback message may include the serial number for identifying the service call message at the first blockchain network 110.

Upon receiving the execution call message, the first service control smart contract 112 may transmit the handle call message including the data for rollback to the first dApp 111 at a step of S716.

In response to receiving the handle call message, the first dApp 111 may roll back to a state prior to transmitting the specific data by using the data for rollback included in the handle call message at a step of S718.

The present disclosure has an effect of providing a method for transmitting the specific data, the format of which is unknown at the relay, from the first blockchain network to the second blockchain network via the relay.

The present disclosure has another effect of enabling each of smart contracts deployed at each of the blockchain networks to call a method of a smart contract deployed at another blockchain network to which it does not belong.

The present disclosure has still another effect of transmitting a message in the form of raw bytes from the first blockchain network to the second blockchain network via the relay and allowing the user to process the relayed message by using the decoding algorithm of the dApp of the second blockchain network, so that a transaction cost of relaying the message is predictable to a certain level regardless of the method of the smart contract to be called.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for transmitting specific data whose data format is unknown at a relay from a first blockchain network to a second blockchain network via the relay, comprising steps of:
   (a) in response to detecting that a blockchain communication message for transmitting the specific data from the first blockchain network following a first data format to the second blockchain network following a second data format is generated, generating, by the relay, a relay message including the blockchain communication message and verification information; and
   (b) transmitting, by the relay, the relay message to the second blockchain network, thereby instructing the second blockchain network to (i) verify the relay message by using the verification information included in the relay message and (ii) convert the specific data included in the relay message into the second data format to generate converted specific data and then transmit the converted specific data to a receiving party,
   before the step of (a), further comprising a step of:
   (a0) deploying, by the relay, (i) a first service control smart contract and a first message control smart contract over the first blockchain network, and (ii) a second service control smart contract and a second message control smart contract over the second blockchain network,
   wherein, at the step of (a), after performing processes of (i) encoding the specific data of the first data format into raw bytes by a first encoding algorithm of a first dApp of the first blockchain network and transmitting a service call message including the raw bytes corresponding to the specific data to the first service control smart contract of the first blockchain network, (ii) transmitting a service message including the service call message by the first service control smart contract to the first message control smart contract of the first blockchain network, and (iii) generating the blockchain communication message including the service message by the first message control smart contract, the relay generates the relay message including the blockchain communication message and the verification information, and
   wherein, at the step of (b), the relay transmits the relay message to the second blockchain network, to thereby instruct the second blockchain network to (i) receive the relay message by the second message control smart contract, (ii) verify the relay message by using the verification information included in the relay message, (iii) confirm the blockchain communication message included in the relay message, (iv) allow the second service control smart contract to receive the service message included in the blockchain communication message, (v) transmit a call message, notifying an arrival of the service message, to a second dApp of the second blockchain network by the second service control smart contract, (vi) transmit an execution call message, requesting the raw bytes corresponding to the specific data, to the second service control smart contract by the second dApp, and (vii) transmit a handle call message including the raw bytes corresponding to the specific data to the second dApp by the second service control smart contract and decode the raw bytes into the specific data of the second data format by using a second decoding algorithm of the second dApp.

2. The method of claim 1, wherein, at the step of (a), (ii) the first dApp requests a relay-relevant fee, for transmission of the raw bytes corresponding to the specific data, to a user of the first dApp, in order to transmit the service message including the service call message to the first message control smart contract of the first blockchain network by the first service control smart contract, and
   wherein, at the step of (b), (vi) the second dApp requests a relay-irrelevant fee, for receipt of the specific data, to a user of the second dApp, in order to transmit the execution call message requesting the raw bytes corresponding to the specific data to the second service control smart contract of the second blockchain network by the second dApp.

3. The method of claim 2, wherein the first service control smart contract is configured to call a second smart contract method of the second blockchain network and the second service control smart contract is configured to call a first smart contract method of the first blockchain network, and wherein the first service control smart contract is managed without knowledge of the second data format of the second blockchain network and the second service control smart contract is managed without knowledge of the first data format of the first blockchain network.

4. The method of claim 1, wherein the service call message additionally includes rollback information to be used for restoring the specific data to a state prior to transmission thereof upon a detection of an error event.

5. The method of claim 1, wherein the blockchain communication message includes (i) a source address corresponding to a blockchain address of the first message control smart contract which has generated the blockchain communication message, (ii) a destination address corresponding to a blockchain address of the second message control smart contract which will receive the blockchain communication message, (iii) a service type identifying a type of a service of the service message, (iv) a serial number identifying the blockchain communication message, and (v) the service message.

6. The method of claim 1, wherein, at the step of (a), after performing processes of (i) encoding the specific data of the first data format into the raw bytes by the first encoding algorithm of the first dApp of the first blockchain network and transmitting the service call message including the raw bytes corresponding to the specific data to the first service control smart contract of the first blockchain network, (ii) upon the service call message being received by the first service control smart contract, (ii-1) responding to the first dApp with a serial number for identification of the service call message, (ii-2) generating the service message including the service call message, (ii-3) generating a transmission service message including the service message, and (ii-4) transmitting the transmission service message to the first message control smart contract of the first blockchain network, and (iii) upon the transmission service message being received by the first message control smart contract of the first blockchain network, (iii-1) generating the blockchain communication message including the service message, and (iii-2) generating a blockchain event message including the blockchain communication message, the relay generates the relay message including the blockchain communication message and the verification information.

7. The method of claim 6, wherein the transmission service message includes (i) a destination network address corresponding to information on a network address of the second blockchain network which will receive the service message, (ii) a service type identifying a type of a service of the service message, (iii) a serial number identifying the transmission service message, and (iv) the service message.

8. The method of claim 6, wherein the blockchain event message includes (i) a destination address corresponding to information on a blockchain address of the second message control smart contract of the second blockchain network to which the blockchain communication message will be transmitted, (ii) the serial number for identifying the service call message at the first blockchain network, and (iii) the blockchain communication message.

9. The method of claim 6, wherein, at the step of (b), the relay transmits a handle relay message including the relay message to the second blockchain network, to thereby instruct the second blockchain network to (i) receive the handle relay message by the second message control smart contract, (ii) (ii-1) generate a verification handle relay message including the relay message and transmit thereof to a second message verification smart contract of the second blockchain network, and (ii-2) verify the verification information included in the relay message in response to the verification handle relay message being received by the second message verification smart contract, (iii) upon confirming by the second message control smart contract that the relay message is successfully verified by the second message verification smart contract, confirm the blockchain communication message included in the relay message, (iv) generate a handle service message included in the service message included in the blockchain communication message and allow the second service control smart contract to receive thereof, (v) upon handle service message being received by the second service control smart contract, confirm the service message included in the handle service message and allow the call message, notifying the arrival of the service message, to be transmitted to the second dApp of the second blockchain network by the second service control smart contract, (vi) upon the call message being detected by the second dApp, transmit the execution call message, requesting the raw bytes corresponding to the specific data, to the second service control smart contract by the second dApp, and (vii) upon the execution call message being received by the second service control smart contract, transmit the handle call message including the raw bytes corresponding to the specific data to the second dApp by the second service control smart contract and decode the raw bytes into the specific data of the second data format by using the second decoding algorithm of the second dApp.

10. The method of claim 9, wherein the verification handle relay message includes (i) a blockchain address of the second message control smart contract which will receive the handle relay message, (ii) a blockchain address of the first message control smart contract which has generated the blockchain communication message, (iii) a serial number identifying the verification handle relay message, and (iv) the relay message.

11. The method of claim 9, wherein the handle service message includes (i) a network address of the first blockchain network which has transmitted the service message, (ii) a service type identifying a type of a service of the service message, (iii) a serial number identifying the handle service message, and (iv) the service message.

12. The method of claim 9, wherein the call message includes (i) an origin address which is a blockchain address, on the first blockchain network, corresponding to an account transmitting the specific data, (ii) a destination address, which is a blockchain address, on the second blockchain network, corresponding to an account receiving the call message, (iii) a serial number identifying the service call message at the first blockchain network, (iv) identification information identifying a request for transmission of data at the second blockchain network, and (v) the specific data.

13. A relay for transmitting specific data whose data format is unknown at the relay from a first blockchain network to a second blockchain network, comprising:
at least one memory that stores instructions; and
at least one processor configured to execute the instructions to perform or support another device to perform:
(I) in response to detecting that a blockchain communication message for transmitting the specific data from the first blockchain network following a first data format to the second blockchain network following a second data format is generated, a process of generating a relay message including the blockchain communication message and verification information; and (II) a process of transmitting the relay message to the second blockchain network, thereby instructing the second blockchain network to (i) verify the relay message by using the verification information included in the relay message and (ii) convert the specific data included in the relay message into the second data format to generate converted specific data and then transmit the converted specific data to a receiving party, wherein, before the process of (I), the processor further performs a process of:

(I0) deploying (i) a first service control smart contract and a first message control smart contract over the first blockchain network, and (ii) a second service control smart contract and a second message control smart contract over the second blockchain network, wherein, at the process of (I), after performing processes of (i) encoding the specific data of the first data format into raw bytes by a first encoding algorithm of a first dApp of the first blockchain network and transmitting a service call message including the raw bytes corresponding to the specific data to the first service control smart contract of the first blockchain network, (ii) transmitting a service message including the service call message by the first service control smart contract to the first message control smart contract of the first blockchain network, and (iii) generating the blockchain communication message including the service message by the first message control smart contract, the processor generates the relay message including the blockchain communication message and the verification information, and wherein, at the process of (II), the processor transmits the relay message to the second blockchain network, to thereby instruct the second blockchain network to (i) receive the relay message by the second message control smart contract, (ii) verify the relay message by using the verification information included in the relay message, (iii) confirm the blockchain communication message included in the relay message, (iv) allow the second service control smart contract to receive the service message included in the blockchain communication message, (v) transmit a call message, notifying an arrival of the service message, to a second dApp of the second blockchain network by the second service control smart contract, (vi) transmit an execution call message, requesting the raw bytes corresponding to the specific data, to the second service control smart contract by the second dApp, and (vii) transmit a handle call message including the raw bytes corresponding to the specific data to the second dApp by the second service control smart contract and decode the raw bytes into the specific data of the second data format by using a second decoding algorithm of the second dApp.

14. The relay of claim 13, wherein, at the process of (I), (ii) the first dApp requests a relay-relevant fee, for transmission of the raw bytes corresponding to the specific data, to a user of the first dApp, in order to transmit the service message including the service call message to the first message control smart contract of the first blockchain network by the first service control smart contract, and wherein, at the process of (II), (vi) the second dApp requests a relay-irrelevant fee, for receipt of the specific data, to a user of the second dApp, in order to transmit the execution call message requesting the raw bytes corresponding to the specific data to the second service control smart contract of the second blockchain network by the second dApp.

15. The relay of claim 14, wherein the first service control smart contract is configured to call a second smart contract method of the second blockchain network and the second service control smart contract is configured to call a first smart contract method of the first blockchain network, and wherein the first service control smart contract is managed without knowledge of the second data format of the second blockchain network and the second service control smart contract is managed without knowledge of the first data format of the first blockchain network.

16. The relay of claim 13, wherein the service call message additionally includes rollback information to be used for restoring the specific data to a state prior to transmission thereof upon a detection of an error event.

17. The relay of claim 13, wherein the blockchain communication message includes (i) a source address corresponding to a blockchain address of the first message control smart contract which has generated the blockchain communication message, (ii) a destination address corresponding to a blockchain address of the second message control smart contract which will receive the blockchain communication message, (iii) a service type identifying a type of a service of the service message, (iv) a serial number identifying the blockchain communication message, and (v) the service message.

18. The relay of claim 13, wherein, at the process of (I), after performing processes of (i) encoding the specific data of the first data format into the raw bytes by the first encoding algorithm of the first dApp of the first blockchain network and transmitting the service call message including the raw bytes corresponding to the specific data to the first service control smart contract of the first blockchain network, (ii) upon the service call message being received by the first service control smart contract, (ii-1) responding to the first dApp with a serial number for identification of the service call message, (ii-2) generating the service message including the service call message, (ii-3) generating a transmission service message including the service message, and (ii-4) transmitting the transmission service message to the first message control smart contract of the first blockchain network, and (iii) upon the transmission service message being received by the first message control smart contract of the first blockchain network, (iii-1) generating the blockchain communication message including the service message, and (iii-2) generating a blockchain event message including the blockchain communication message, the processor generates the relay message including the blockchain communication message and the verification information.

19. The relay of claim 18, wherein the transmission service message includes (i) a destination network address corresponding to information on a network address of the second blockchain network which will receive the service message, (ii) a service type identifying a type of a service of the service message, (iii) a serial number identifying the transmission service message, and (iv) the service message.

20. The relay of claim 18, wherein the blockchain event message includes (i) a destination address corresponding to information on a blockchain address of the second message control smart contract of the second blockchain network to which the blockchain communication message will be transmitted, (ii) the serial number for identifying the service call message at the first blockchain network, and (iii) the blockchain communication message.

21. The relay of claim 18, wherein, at the process of (II), the processor transmits a handle relay message including the relay message to the second blockchain network, to thereby instruct the second blockchain network to (i) receive the handle relay message by the second message control smart contract, (ii) (ii-1) generate a verification handle relay message including the relay message and transmit thereof to a second message verification smart contract of the second blockchain network, and (ii-2) verify the verification information included in the relay message in response to the verification handle relay message being received by the second message verification smart contract, (iii) upon confirming by the second message control smart contract that the relay message is successfully verified by the second message verification smart contract, confirm the blockchain communication message included in the relay message, (iv) generate a handle service message included in the service message included in the blockchain communication message and allow the second service control smart contract to receive thereof, (v) upon handle service message being received by the second service control smart contract, confirm the service message included in the handle service message and allow the call message, notifying the arrival of the service message, to be transmitted to the second dApp of the second blockchain network by the second service control smart contract, (vi) upon the call message being detected by the second dApp, transmit the execution call message, requesting the raw bytes corresponding to the specific data, to the second service control smart contract by the second dApp, and (vii) upon the execution call message being received by the second service control smart contract, transmit the handle call message including the raw bytes corresponding to the specific data to the second dApp by the second service control smart contract and decode the raw bytes into the specific data of the second data format by using the second decoding algorithm of the second dApp.

22. The relay of claim 21, wherein the verification handle relay message includes (i) a blockchain address of the second message control smart contract which will receive the handle relay message, (ii) a blockchain address of the first message control smart contract which has generated the blockchain communication message, (iii) a serial number identifying the verification handle relay message, and (iv) the relay message.

23. The relay of claim 21, wherein the handle service message includes (i) a network address of the first blockchain network which has transmitted the service message, (ii) a service type identifying a type of a service of the service message, (iii) a serial number identifying the handle service message, and (iv) the service message.

24. The relay of claim 21, wherein the call message includes (i) an origin address which is a blockchain address, on the first blockchain network, corresponding to an account transmitting the specific data, (ii) a destination address, which is a blockchain address, on the second blockchain network, corresponding to an account receiving the call message, (iii) a serial number identifying the service call message at the first blockchain network, (iv) identification information identifying a request for transmission of data at the second blockchain network, and (v) the specific data.

* * * * *